(12) United States Patent
Okamoto et al.

(10) Patent No.: US 9,950,507 B2
(45) Date of Patent: Apr. 24, 2018

(54) THREE-DIMENSIONAL STRUCTURE MANUFACTURING APPARATUS, MANUFACTURING METHOD OF THREE-DIMENSIONAL STRUCTURE, AND THREE-DIMENSIONAL STRUCTURE

(71) Applicant: SEIKO EPSON CORPORATION, Tokyo (JP)

(72) Inventors: Eiji Okamoto, Nagano (JP); Junichi Goto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 547 days.

(21) Appl. No.: 14/641,558

(22) Filed: Mar. 9, 2015

(65) Prior Publication Data

US 2015/0258733 A1  Sep. 17, 2015

(30) Foreign Application Priority Data

Mar. 14, 2014 (JP) ................................ 2014-052725

(51) Int. Cl.
| | |
|---|---|
| *B33Y 80/00* | (2015.01) |
| *B33Y 10/00* | (2015.01) |
| *B33Y 30/00* | (2015.01) |
| *B29C 64/165* | (2017.01) |

(52) U.S. Cl.
CPC ............ *B33Y 80/00* (2014.12); *B29C 64/165* (2017.08); *B33Y 10/00* (2014.12); *B33Y 30/00* (2014.12); *Y10T 428/31511* (2015.04); *Y10T 428/31663* (2015.04)

(58) Field of Classification Search
CPC .. C09D 101/02; C09D 101/00; C09D 101/04; C09D 101/06; B41M 5/5236; C08K 5/17; C08K 5/19; D21H 19/12; D21H 19/34; Y10T 428/31971; Y10T 428/31982
USPC ..................................................... 428/537.5
See application file for complete search history.

(56) References Cited

U.S. PATENT DOCUMENTS

| | | | |
|---|---|---|---|
| 3,732,107 A | 5/1973 | Faust | |
| 3,857,885 A | 12/1974 | Faust | |
| 4,458,006 A | 7/1984 | Doenges et al. | |
| 4,495,271 A | 1/1985 | Geissler et al. | |
| 4,530,747 A | 7/1985 | Donges et al. | |
| 4,987,053 A | 1/1991 | Gersdorf et al. | |
| 5,200,299 A | 4/1993 | Steppan et al. | |
| 6,799,959 B1 | 10/2004 | Tochimoto et al. | |
| 9,393,740 B2 * | 7/2016 | Okamoto | B29C 67/0059 |
| 9,415,545 B2 * | 8/2016 | Okamoto | B29C 67/0081 |
| 9,463,614 B2 * | 10/2016 | Okamoto | B29C 67/0092 |
| 9,481,162 B2 * | 11/2016 | Okamoto | B29C 64/40 |
| 9,579,852 B2 * | 2/2017 | Okamoto | B29C 67/0092 |
| 9,597,838 B2 * | 3/2017 | Okamoto | B29C 67/0085 |
| 9,676,144 B2 * | 6/2017 | Okamoto | B29C 67/0059 |
| 2001/0050448 A1 | 12/2001 | Kubo et al. | |

FOREIGN PATENT DOCUMENTS

| | | | |
|---|---|---|---|
| JP | 46-027926 A | | 8/1971 |
| JP | 48-041708 A | | 12/1973 |
| JP | 51-047334 B | | 12/1976 |
| JP | 54-021726 B | | 8/1979 |
| JP | 57-196231 A | | 12/1982 |
| JP | 59-005240 A | | 1/1984 |
| JP | 59-005241 A | | 1/1984 |
| JP | 01-165613 A | | 6/1989 |
| JP | 02-226149 A | | 9/1990 |
| JP | 2001-334581 | * | 4/2001 |
| JP | 2001-150556 | * | 5/2001 |
| JP | 2001-150556 A | | 6/2001 |
| JP | 2001-334581 A | | 12/2001 |

\* cited by examiner

*Primary Examiner* — Leszek Kiliman

(57) ABSTRACT

Provided is a three-dimensional structure manufacturing apparatus which manufactures a three-dimensional structure by laminating layers formed using three-dimensional formation compositions containing three-dimensional formation powders, the apparatus including: a formation unit in which the three-dimensional structure is formed; a first supply unit and a second supply unit which supply the three-dimensional formation compositions to the formation unit; a first squeegee and a second squeegee which form the layers configured with the three-dimensional formation compositions on the formation unit; and a discharge unit which discharges a binding solution for binding the three-dimensional formation compositions to the layer, in which the first supply unit, the first squeegee, the discharge unit, the second squeegee, and the second supply unit are arranged in this order, along a movement direction of the discharge unit.

20 Claims, 2 Drawing Sheets

THREE-DIMENSIONAL STRUCTURE MANUFACTURING APPARATUS, MANUFACTURING METHOD OF THREE-DIMENSIONAL STRUCTURE, AND THREE-DIMENSIONAL STRUCTURE

BACKGROUND

1. Technical Field

The present invention relates to a three-dimensional structure manufacturing apparatus, a manufacturing method of a three-dimensional structure, and a three-dimensional structure.

2. Related Art

A three-dimensional structure manufacturing apparatus which forms a three-dimensional object by solidifying powders with a binding solution has been known (for example, see JP-A-2001-150556). With this manufacturing apparatus, a three-dimensional object is formed by repeating the following operations. First, the powders are spread thin by a blade to form a powder layer, and the binding solution is discharged to a desired portion of the powder layer, and accordingly the powders are bound to each other. As a result, among the powder layer, the part having the binding solution discharged thereto is only bound, and a thin plate-shaped member (hereinafter, referred to as a "unit layer") is formed. After that, a powder layer is further formed thin on the above powder layer and the binding solution is discharged to the desired part. As a result, a new unit layer is also formed on a part of the newly formed powder layer newly formed, having the binding solution discharged thereto. At that time, since the binding solution discharged permeates the powder layer and reaches the unit layer previously formed, the newly formed unit layer is also bound with the previously formed unit layer. Such operations are repeated to laminate the thin plate-shaped unit layers one by one, and accordingly, a three-dimensional object can be formed.

With such a three-dimensional formation technology (three-dimensional structure manufacturing apparatus), it is possible to bind the powders to immediately form the structure, as long as three-dimensional shape data of an object to be formed is provided, and since it is not necessary to manufacture a mold prior to the formation, it is possible to form a three-dimensional object in a short period of time at a low cost. In addition, since the structure is formed by laminating the thin plate-shaped unit layers one by one, it is even possible to form a complicated object having an internal structure, for example, an integrated structure without dividing the structure into a plurality of components.

However, in the three-dimensional structure manufacturing apparatus of the related art, production efficiency of the three-dimensional structure is low, and thus, additional improvement of productivity has been required.

SUMMARY

An advantage of some aspects of the invention is to provide a three-dimensional structure manufacturing apparatus which can prevent three-dimensional formation compositions from being attached a discharge unit and efficiently manufacture a three-dimensional structure, a manufacturing method of a three-dimensional structure which can efficiently manufacture a three-dimensional structure, and a three-dimensional structure which is manufactured by the three-dimensional structure manufacturing apparatus and the manufacturing method of a three-dimensional structure.

The invention is realized in the following forms.

According to an aspect of the invention, there is provided a three-dimensional structure manufacturing apparatus which manufactures a three-dimensional structure by laminating layers formed using three-dimensional formation compositions containing three-dimensional formation powders, the apparatus including: a formation unit in which the three-dimensional structure is formed; a first supply unit and a second supply unit which supply the three-dimensional formation compositions to the formation unit; a first layer formation unit and a second layer formation unit which form the layers configured with the three-dimensional formation compositions on the formation unit; and a discharge unit which discharges a binding solution to the layer, in which the discharge unit which discharges the binding solution to the layers while relatively moving with respect to the layer, and the first supply unit, the first layer formation unit, the discharge unit, the second layer formation unit, and the second supply unit are arranged in this order, along a movement direction of the discharge unit.

In this case, it is possible to provide a three-dimensional structure manufacturing apparatus which can prevent the three-dimensional formation compositions from being attached to the discharge unit and efficiently manufacture a three-dimensional structure.

In the three-dimensional structure manufacturing apparatus according to the aspect of the invention, it is preferable to further include a first ultraviolet ray irradiation unit which emits an ultraviolet ray between the second layer formation unit and the discharge unit; and a second ultraviolet ray irradiation unit which emits an ultraviolet ray between the first layer formation unit and the discharge unit.

In this case, it is possible to prevent the three-dimensional formation compositions from being attached to the discharge unit and to more efficiently manufacture a three-dimensional structure.

In the three-dimensional structure manufacturing apparatus according to the aspect of the invention, it is preferable to further include collection units which collect the excess of the three-dimensional formation compositions when forming the layer.

In this case, it is possible to more efficiently manufacture a three-dimensional structure.

In the three-dimensional structure manufacturing apparatus according to the aspect of the invention, it is preferable to further include two guide rails which guide the movement of the first layer formation unit and the second layer formation unit, and that an enclosed space surrounding the discharge unit is formed by the first layer formation unit and the second layer formation unit and the two guide rails.

In this case, it is possible to more effectively prevent the three-dimensional formation compositions from being attached to the discharge unit.

In the manufacturing apparatus according to the aspect of the invention, it is preferable to further include a vibration unit which applies vibration to the first layer formation unit and the second layer formation unit.

In this case, it is possible to prevent the three-dimensional formation compositions from being attached to the layer formation units.

In the manufacturing apparatus according to the aspect of the invention, it is preferable that the first supply unit and the first layer formation unit are configured to be integrated, and the second supply unit and the second layer formation unit are configured to be integrated.

In this case, it is possible to more efficiently manufacture a three-dimensional structure.

In the manufacturing apparatus according to the aspect of the invention, it is preferable that the first layer formation unit and the second layer formation unit are one kind selected from a group consisting of squeegees and rollers.

In this case, it is possible to form the layers with a more uniform thickness and to increase the dimensional accuracy of a three-dimensional structure to be manufactured.

According to another aspect of the invention, there is provided a manufacturing method of a three-dimensional structure which manufactures a three-dimensional structure using the three-dimensional structure manufacturing apparatus according to the aspects of the invention.

In this case, it is possible to efficiently manufacture a three-dimensional structure with high dimensional accuracy.

According to still another aspect of the invention, there is provided a three-dimensional structure which is manufactured by the three-dimensional structure manufacturing apparatus according to the aspects of the invention.

In this case, it is possible to efficiently obtain a three-dimensional structure.

According to still another aspect of the invention, there is provided a three-dimensional structure which is manufactured by the manufacturing method of a three-dimensional structure according to the aspects of the invention.

In this case, it is possible to efficiently obtain a three-dimensional structure.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in detail with reference to the accompanying drawings.

1. Three-Dimensional Structure Manufacturing Apparatus

First, a preferred embodiment of a three-dimensional structure manufacturing apparatus of the invention will be described.

Figure 1A:
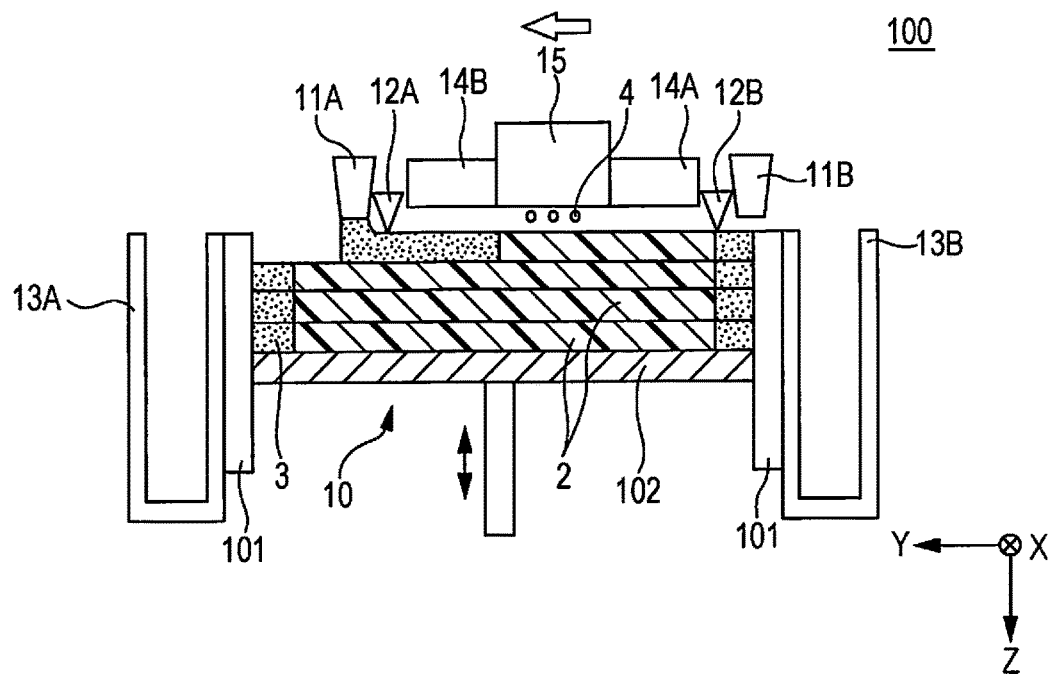
FIGS. 1A and 1B are cross-sectional views showing a preferred embodiment of a three-dimensional structure manufacturing apparatus of the invention.
Figure 1B:
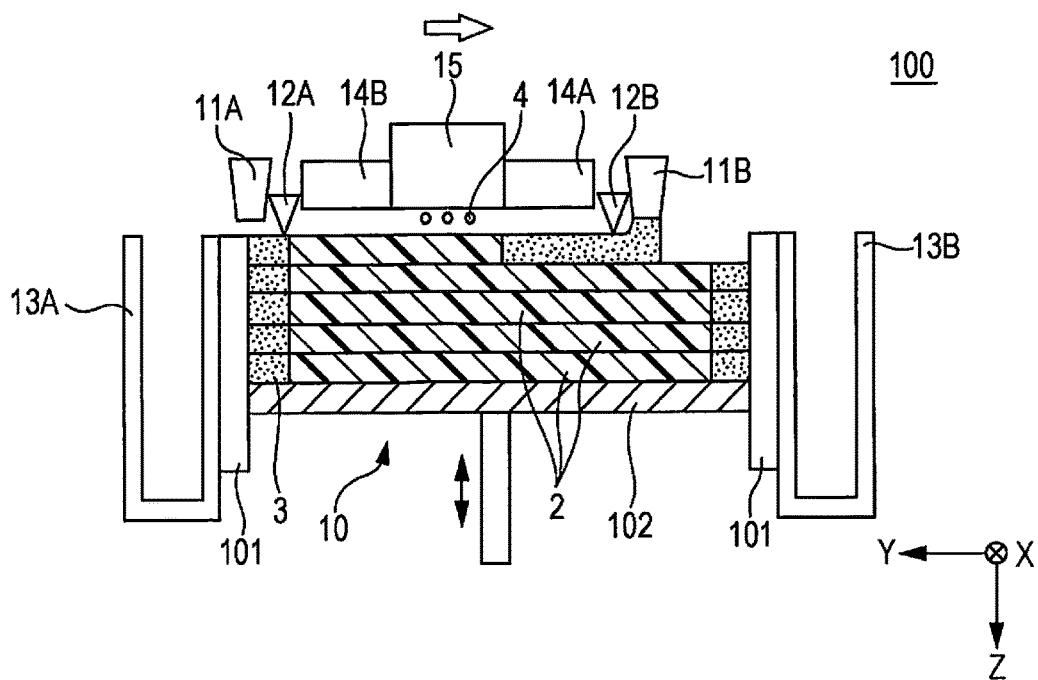
Figure 2:
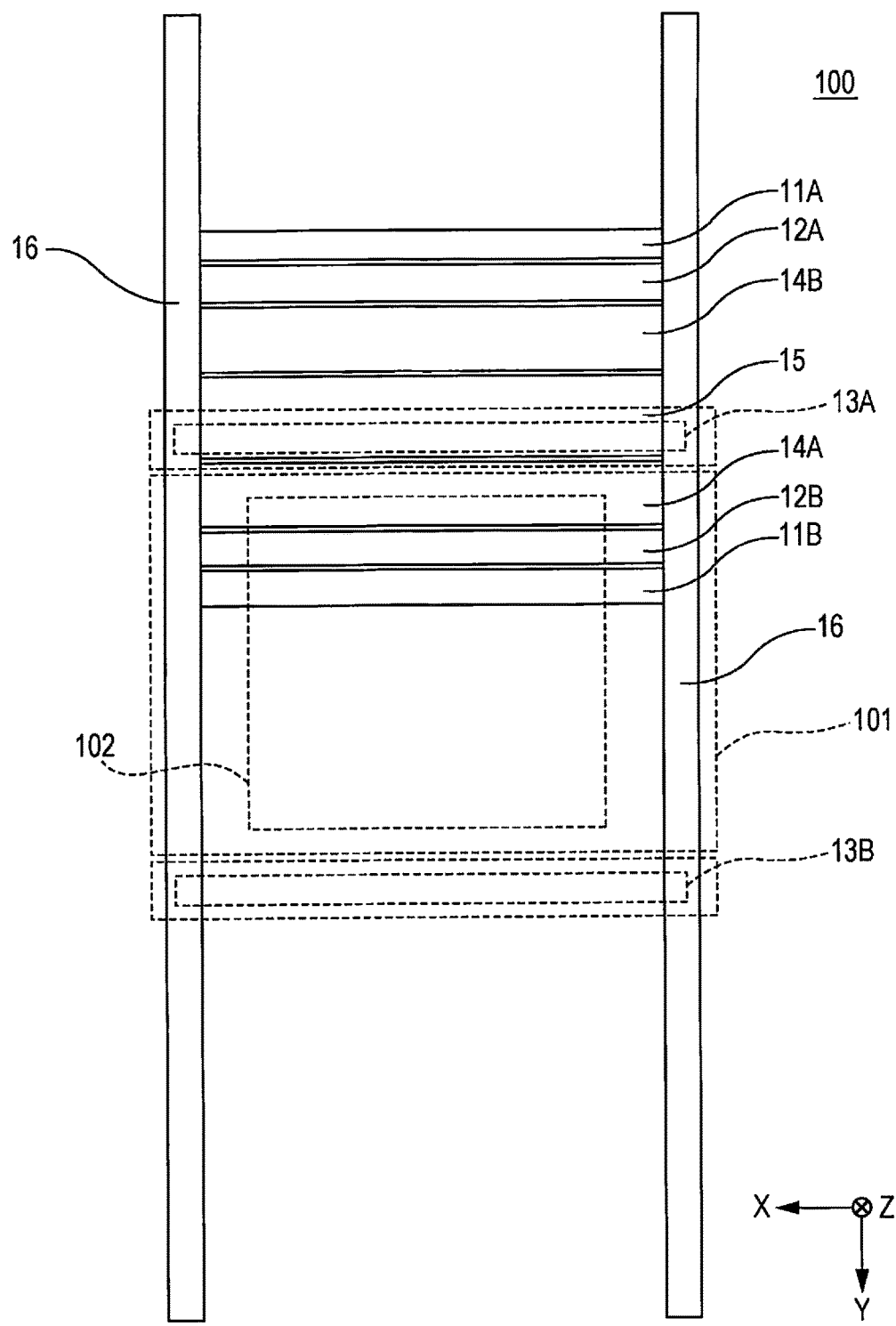
FIG. 2 is a plan view showing a preferred embodiment of a three-dimensional structure manufacturing apparatus of the invention.

FIGS. 1A and 1B are cross-sectional views showing a preferred embodiment of a three-dimensional structure manufacturing apparatus of the invention and FIG. 2 is a plan view showing a preferred embodiment of a three-dimensional structure manufacturing apparatus of the invention.

A three-dimensional structure manufacturing apparatus 100 is an apparatus which manufactures a three-dimensional structure by laminating unit layers 2 formed by using a three-dimensional formation composition containing three-dimensional formation powders.

As shown in FIGS. 1A to 2, the three-dimensional structure manufacturing apparatus 100 includes a formation unit 10 in which a three-dimensional structure is formed, a first supply unit 11A and a second supply unit 11B which supply three-dimensional formation compositions, a first squeegee (layer formation unit) 12A and a second squeegee (layer formation unit) 12B which form a layer 1 of the three-dimensional formation compositions on the formation unit 10 using the supplied three-dimensional formation compositions, a first collection unit 13A and a second collection unit 13B which collects the excess of the three-dimensional formation compositions when forming the layer 1, a first ultraviolet ray irradiation unit 14A and a second ultraviolet ray irradiation unit 14B, a discharge unit 15 which discharges a binding solution 4 containing a binding agent to the layer 1, and guide rails 16. The three-dimensional formation compositions and the binding solution 4 will be described later.

As shown in FIGS. 1A to 2, the formation unit 10 includes a frame body 101 and a formation stage 102 provided in the frame body 101.

The frame body 101 is configured with a frame-shaped member.

The formation stage 102 has a rectangular shape in the XY plane.

The formation stage 102 is configured to be driven (moved up and down) in a Z axis direction by a driving unit (not shown).

The layer 1 is formed in an area which is formed with an inner wall surface of the frame body 101 and the formation stage 102.

In the embodiment, the second ultraviolet ray irradiation unit 14B, the first squeegee 12A, and the first supply unit 11A are disposed in a line from the side of the discharge unit 15 in one Y axis direction (left direction in the drawings). In addition, the first ultraviolet ray irradiation unit 14A, the second squeegee 12B, and the second supply unit 11B are disposed in a line from the side of the discharge unit 15 in one of the other Y axis directions (right direction in the drawings).

The first supply unit 11A and the second supply unit 11B have a function of supplying the three-dimensional formation compositions to the formation stage 102. The first supply unit 11A and the second supply unit 11B can be driven in the Y axis direction.

The first squeegee (layer formation unit) 12A and the second squeegee 12B have a plate shape elongated in an X axis direction. The first squeegee 12A and the first supply unit 11A are integrated and the second squeegee 12B and the second supply unit 11B are integrated.

The first squeegee 12A has a function of forming the layer 1 on the formation stage 102 using the three-dimensional formation compositions supplied from the first supply unit 11A. The second squeegee 12B has a function of forming the layer 1 on the formation stage 102 using the three-dimensional formation compositions supplied from the second supply unit 11B.

The first squeegee 12A is configured so as to separate the first supply unit 11A and the discharge unit 15 from each other. In addition, the second squeegee 12B is configured so as to separate the second supply unit 11B and the discharge unit 15 from each other. Accordingly, it is possible to prevent the discharge unit 15 from being stained due to scattering or splashing of the three-dimensional formation compositions when the three-dimensional formation compositions are supplied from each supply unit.

The first squeegee 12A and the second squeegee 12B are configured so as to be driven in the Y axis direction.

Vibration units (not shown) for applying vibration are provided on the first squeegee 12A and the second squeegee 12B. By applying vibration to the first squeegee 12A and the second squeegee 12B, it is possible to prevent the three-dimensional formation compositions from being attached to the first squeegee 12A and the second squeegee 12B.

The first collection unit 13A and the second collection unit 13B are box-shaped members having an opened upper surface. The first collection unit 13A and the second collection unit 13B have a function of collecting the excess of the three-dimensional formation compositions in the formation of the layer 1.

The first collection unit 13A and the second collection unit 13B are connected to the frame body 101 and are provided so as to face each other with the frame body 101 interposed therebetween.

The excess of the three-dimensional formation compositions carried by the first squeegee 12A and the second squeegee 12B are respectively collected by the first collection unit 13A and the second collection unit 13B, and the collected three-dimensional formation compositions are provided for reuse.

The first ultraviolet ray irradiation unit 14A and the second ultraviolet ray irradiation unit 14B have a function of curing the binding solution 4 discharged to the layer 1 with an ultraviolet ray.

The discharge unit 15 has a function of discharging the binding solution 4 to the formed layer 1 while moving in the Y axis direction.

A liquid droplet discharge head which discharges liquid droplets of the binding solution 4 by an ink jet method is mounted on the discharge unit 15. The discharge unit 15 includes a binding solution 4 supply unit (not shown). In the embodiment, a so-called piezoelectric drive type liquid droplet discharge head is employed. In addition, in the embodiment, as the discharge unit 15, a line head including a plurality of liquid droplet discharge heads arranged in the X axis direction is used.

The two guide rails 16 are elongated members having the Y axis direction as a longitudinal direction and are connected to edges of the first squeegee 12A and the second squeegee 12B in the longitudinal direction. The guide rails 16 have a function of guiding the movement of the first squeegee 12A and the second squeegee 12B. In addition, an enclosed space surrounding the discharge unit 15 is formed by the two guide rails 16 and the first squeegee 12A and the second squeegee 12B. Therefore, it is possible to more effectively prevent the discharge unit 15 from being stained due to scattering or splashing of the three-dimensional formation compositions when the three-dimensional formation compositions are supplied from each supply unit.

In the embodiment, in addition to the first squeegee 12A and the second squeegee 12B, the guide rails 16 are also configured to guide the movement of the first supply unit 11A, the second ultraviolet ray irradiation unit 14B, the discharge unit 15, the first ultraviolet ray irradiation unit 14A, and the second supply unit 11B.

In the three-dimensional structure manufacturing apparatus 100 of the embodiment, a unit layer formation unit configured with the first supply unit 11A, the first squeegee 12A, the second ultraviolet ray irradiation unit 14B, the discharge unit 15, the first ultraviolet ray irradiation unit 14A, the second squeegee 12B, and the second supply unit 11B is integrally formed, and is configured so that each unit is operated while moving in the Y axis direction along the guide rails 16.

Specifically, as shown in FIG. 1A, in the three-dimensional structure manufacturing apparatus 100, the unit layer formation unit is integrally formed and discharges the binding solution 4 to the layer 1 by the discharging unit 15, while moving to the left in the drawings and forming the layer 1 by the first supply unit 11A and the first squeegee 12A. The binding solution 4 in the layer 1 is cured by the first ultraviolet ray irradiation unit 14A. Accordingly, a unit layer 2 is formed.

Then, as shown in FIG. 1B, the unit layer discharges the binding solution 4 to the layer 1 by the discharging unit 15, while moving to the right in the drawings and forming the layer 1 by the second supply unit 11B and the second squeegee 12B. The binding solution 4 in the layer 1 is cured by the second ultraviolet ray irradiation unit 14B. Accordingly, the unit layer 2 is formed.

With such a configuration, it is possible to collectively perform the formation of the unit layer 2 and the formation of the layer 1 and it is possible to efficiently form the unit layer in both directions. As a result, it is possible to efficiently manufacture the three-dimensional structure. Since each supply unit and the discharge unit 15 are separated from each other, it is possible to prevent the three-dimensional formation compositions from being attached to the discharge unit 15.

In FIG. 1A, the second ultraviolet ray irradiation unit 14B is configured to irradiate the layer 1 (unit layer 2) lower than the layer 1, to which the binding solution 4 is discharged, with an ultraviolet ray through the layer 1, to which the binding solution 4 is discharged. In FIG. 1B, the first ultraviolet ray irradiation unit 14A is configured to irradiate the layer 1 (unit layer 2) lower than the layer 1, to which the binding solution 4 is discharged, with an ultraviolet ray through the layer 1, to which the binding solution 4 is discharged. Accordingly, it is possible to additionally promote the curing of the binding solution 4 discharged to the layer 1 and it is possible to increase mechanical strength of the three-dimensional structure to be acquired.

In the above description, a case of using the first squeegee 12A and the second squeegee 12B as the layer formation unit has been described, but the layer formation unit is not limited to the squeegee, and a roller may be used, for example.

In addition, a removing unit which removes the three-dimensional formation compositions attached to the first squeegee 12A and the second squeegee 12B may be provided in the first collection unit 13A and the second collection unit 13B. A configuration of applying vibration by ultrasonic waves, wipers, static electricity, an piezoelectric element (electrostrictive element), an eccentric motor, or a magnetostrictor can be used as the removing unit.

Each member of the first squeegee 12A, the first supply unit 11A, the first ultraviolet ray irradiation unit 14A, the discharge unit 15, the second ultraviolet ray irradiation unit 14B, the second supply unit 11B, and the second squeegee 12B is configured so as to independently adjust a height.

A maintenance area (not shown) of the discharge unit 15 is provided on the outer side of the first collection unit 13A and the second collection unit 13B in the Y axis direction, and the discharge unit is configured to perform maintenance such as flushing in the maintenance area, after the three-dimensional formation compositions are collected in each collection unit.

A case of using the ultraviolet ray irradiation units as the curing unit of the binding solution 4 has been described, but there is no limitation, and a heating unit may be used, for example.

2. Manufacturing Method of Three-Dimensional Structure

A manufacturing method of a three-dimensional structure of the embodiment includes a layer formation step of forming the layer 1 using the three-dimensional formation compositions, and a discharge step of discharging the binding solution 4 to the layer 1, and the binding solution 4 is discharged to the layer 1 while forming the layer 1.

Hereinafter, the three-dimensional structure manufacturing apparatus 100 will be described as an example.

First, The first layer 1 is formed by the first squeegee 12A while moving the unit layer formation unit to the left side of the FIG. 1A and supplying the three-dimensional formation compositions to the formation stage 102 by the first supply unit 11A. The binding solution 4 is discharged to the layer 1 by the discharge unit 15 while forming the layer 1, and then, the binding solution 4 is cured by the first ultraviolet ray irradiation unit 14A to form the first unit layer 2.

A thickness of the layer 1 is not particularly limited, but is preferably from 30 µm to 500 µm and more preferably from 70 µm to 150 µm. Accordingly, it is possible to realize a sufficiently excellent productivity of the three-dimensional structure, to more effectively prevent generation of unexpected irregularities on the three-dimensional structure to be manufactured, and to realize particularly excellent dimensional accuracy of the three-dimensional structure.

Next, when squeegee 12A completes the formation of the first layer 1, the formation stage 102 moves downward by an amount of the thickness of the layer 1. The second layer 1 is formed by the second squeegee 12B while moving the unit layer formation unit to the right side of the FIG. 1B and supplying the three-dimensional formation compositions to the formation stage 102 by the second supply unit 11B. The binding solution 4 is discharged to the layer 1 by the discharge unit 15 while forming the layer 1, and then, the binding solution 4 is cured by the first ultraviolet ray irradiation unit 14A to form the second unit layer 2.

The unit layers 2 are additionally laminated by repeating these steps, and then a non-cured portion 3 of the three-dimensional formation compositions is removed, and accordingly, a three-dimensional structure is obtained.

3. Three-Dimensional Formation Compositions

Next, the three-dimensional formation compositions will be described in detail.

The three-dimensional formation compositions contain the three-dimensional formation powders.

The three-dimensional formation compositions of the embodiment contain the three-dimensional formation powders and an aqueous resin.

Hereinafter, each component will be described in detail.
Three-Dimensional Formation Powders The three-dimensional formation powders are configured with the plurality of particles.

Any particles can be used as the particles, but the particles are preferably configured with porous particles. Accordingly, it is possible to make the binding agent in the binding solution suitably permeate the inside of the holes, when manufacturing the three-dimensional structure, and therefore, it is possible to preferably use the particles in manufacturing the three-dimensional structure having excellent mechanical strength.

As a constituent material of the porous particles configuring the three-dimensional formation particles, an inorganic material or an organic material, or a complex of these is used, for example.

Examples of the inorganic material configuring the porous particles include various metals or metal compounds. Examples of the metal compounds include various metal oxides such as silica, alumina, titanium oxide, zinc oxide, zirconium oxide, tin oxide, magnesium oxide, and potassium titanate; various metal hydroxides such as magnesium hydroxide, aluminum hydroxide, and calcium hydroxide; various metal nitrides such as silicon nitride, titanium nitride, and aluminum nitride; various metal carbide such as silicon carbide and titanium carbide; various metal sulfide such as zinc sulfide; various metal carbonates such as calcium carbonate and magnesium carbonate; various metal sulfates such as calcium sulfate and magnesium sulfate; various metal silicates such as calcium silicate and magnesium silicate; various metal phosphates such as calcium phosphate; various metal borates such as aluminum borate and magnesium borate; and a composite compound thereof.

Examples of the organic material configuring the porous particles include a synthetic resin and a natural polymer, and specific examples thereof include a polyethylene resin; polypropylene; polyethylene oxide; polypropylene oxide; polyethylene imine; polystyrene; polyurethane; polyurea; polyester; a silicone resin; an acrylic silicone resin; a polymer having ester (meth)acrylate such as methyl polymethacrylate as a constituent monomer; a crosspolymer having (meth)acrylate such as a methyl methacrylate crosspolymer as a constituent monomer (such as an ethylene-acrylic acid copolymer resin); a polyamide resin such as nylon 12, nylon 6, or copolymer nylon; polyimide; carboxymethyl cellulose; gelatin; starch; chitin; and chitosan.

Among these, the porous particles are preferably configured with the organic material, and more preferably configured with metal oxide, and even more preferably configured with silica. Therefore, it is possible to realize particularly excellent properties such as mechanical strength and light resistance of the three-dimensional structure. Particularly, when the porous particles are configured with silica, the effects described above are more significantly exhibited. Since silica has also excellent fluidity, it is advantageous in forming the layer 1 having higher uniformity in thickness and it is possible to realize particularly excellent productivity and dimensional accuracy of the three-dimensional structure.

As silica, a product commercially available in a market can be preferably used. Specific examples thereof include MIZKASIL P-526, MIZKASIL P-801, MIZKASIL NP-8, MIZKASIL P-802, MIZKASIL P-802Y, MIZKASIL C-212, MIZKASIL P-73, MIZKASIL P-78A, MIZKASIL P-78F, MIZKASIL P-87, MIZKASIL P-705, MIZKASIL P-707, MIZKASIL P-707D, MIZKASIL P-709, MIZKASIL C-402, MIZKASIL C-484 (all manufactured by Mizusawa Industrial Chemicals, Ltd.), TOKUSIL U, TOKUSIL UR, TOKUSIL GU, TOKUSIL AL-1, TOKUSIL GU-N, TOKUSIL N, TOKUSIL NR, TOKUSIL PR, SOLEX, FINESIL E-50, FINESIL T-32, FINESIL X-30, FINESIL X-37, FINESIL X-37B, FINESIL X-45, FINESIL X-60, FINESIL X-70, FINESIL RX-70, FINESIL A, FINESIL B (all manufactured by Tokuyama Corporation), SIPERNAT, CARPLEX FPS-101, CARPLEX CS-7, CARPLEX 22S, CARPLEX 80, CARPLEX 80D, CARPLEX XR, CARPLEX 67 (all manufactured by DSL JAPAN Co., Ltd.), SYLOID 63, SYLOID 65, SYLOID 66, SYLOID 77, SYLOID 74, SYLOID 79, SYLOID 404, SYLOID 620, SYLOID 800, SYLOID 150, SYLOID 244, SYLOID 266 (all manufactured by Fuji Silysia Chemical Ltd.), NIPGEL AY-200, NIPGEL AY-6A2, NIPGEL AZ-200, NIPGEL AZ-6A0, NIPGEL BY-200, NIPGEL CX-200, NIPGEL CY-200, Nipsil E-150J, Nipsil E-220A, and Nipsil E-200A (all manufactured by Tosoh Silica Corporation).

The porous particles are preferably subjected to hydrophobic treatment. Meanwhile, the binding agent contained in the binding solution generally tends to have hydrophobicity. Accordingly, since the porous particles are subjected to the hydrophobic treatment, it is possible make the binding agent suitably permeate the inside of the holes of the porous particles. As a result, an anchor effect is more significantly exhibited, and it is possible to realize more excellent mechanical strength of the three-dimensional structure to be acquired. In addition, when the porous particles are subjected to the hydrophobic treatment, it is possible to preferably reuse the porous particles. For more specific description, when the porous particles are subjected to the hydrophobic treatment, affinity between the water-soluble resin which will be described later and the porous particles decreases, and therefore the introduction of the water-soluble resin into the holes is prevented. As a result, in the manufacturing of the three-dimensional structure, it is possible to easily remove impurities in the porous particles in an area with no binding solution applied, by washing with water or the like, and it is possible to collect the particles with high purity. Thus, by mixing the collected three-dimensional formation powders with the water-soluble resin at a predetermined ratio again, it is possible to obtain the three-dimensional formation powders reliably controlled to have a desired composition.

Any treatment may be performed as the hydrophobic treatment performed for the porous particles configuring the three-dimensional formation powders, as long as it is treatment for increasing hydrophobicity of the porous particles, and it is preferable to introduce a hydrocarbon group. Accordingly, it is possible to further increase the hydrophobicity of the particles. In addition, it is possible to easily and reliably increase uniformity of the degree of the hydrophobic treatment on each particle and each portion of the particle surface (including surface of the inside of the hole).

A compound used in the hydrophobic treatment is preferably a silane compound including a silyl group. Specific examples of the compound which can be used in the hydrophobic treatment include hexamethyldisilazane, dimethyldimethoxysilane, diethyl diethoxysilane, 1-propenyl methyl dichlorosilane, propyl dimethyl chlorosilane, propyl methyl dichlorosilane, propyl trichlorosilane, propyl triethoxysilane, propyl trimethoxysilane, styrylethyltrimethoxysilane, tetradecyl trichlorosilane, 3-thiocyanate propyl triethoxysilane, p-tolyl dimethyl chlorosilane, p-tolyl methyl dichlorosilane, p-tolyl trichlorosilane, p-tolyl trimethoxysilane, p-tolyl triethoxysilane, di-n-propyl di-n-propoxysilane, diisopropyl diisopropoxy silane, di-n-butyl di-n-butyroxy silane, di-sec-butyl di-sec-butyroxy silane, di-t-butyl di-t-butyroxy silane, octadecyl trichlorosilane, octadecyl methyldiethoxysilane, octadecyltriethoxysilane, octadecyltrimethoxysilane, octadecyldimethylchlorosilane, octadecyl methyl dichlorosilane, octadecyl methoxy dichlorosilane, 7-octenyl dimethyl chlorosilane, 7-octenyl trichlorosilane, 7-octenyl trimethoxysilane, octyl methyl dichlorosilane, octyl dimethyl chlorosilane, octyl trichlorosilane, 10-undecenyl dimethyl chlorosilane, undecyl trichlorosilane, vinyl dimethyl chlorosilane, methyl octadecyl dimethoxy silane, methyl dodecyl diethoxysilane, methyl octadecyl dimethoxy silane, methyl octadecyl diethoxy silane, n-octyl methyl dimethoxy silane, n-octyl methyldiethoxysilane, triacontyl dimethylchlorosilane, triacontyl trichlorosilane, methyl trimethoxysilane, methyl triethoxysilane, methyl tri-n-propoxysilane, methyl isobutyl propoxysilane, methyl-n-butyroxy silane, methyltri-sec-butyroxy silane, methyltri-t-butyroxy silane, ethyl trimethoxysilane, ethyl triethoxysilane, ethyltri-n-propoxysilane, ethyl iso-propoxysilane, ethyl-n-butyroxy silane, ethyltri-sec-butyroxy silane, ethyltri-t-butyroxy silane, n-propyl trimethoxy silane, isobutyl trimethoxysilane, n-hexyl trimethoxysilane, hexadecyl trimethoxysilane, n-octyl trimethoxysilane, n-dodecyl trimethoxysilane, n-octadecyl trimethoxysilane, n-propyl triethoxysilane, isobutyl triethoxysilane, n-hexyl triethoxysilane, hexadecyl triethoxysilane, n-octyl triethoxysilane, n-dodecyl trimethoxysilane, n-octadecyltriethoxysilane, 2-[2-(trichlorosilyl) ethyl]pyridine, 4-[2-(trichlorosilyl) ethyl]pyridine, diphenyldimethoxysilane, diphenyldiethoxysilane, 1,3 (trichlorosilyl methyl) heptacosane, dibenzyl dimethoxy silane, dibenzyl diethoxy silane, phenyl trimethoxysilane, phenyl methyl dimethoxy silane, phenyl dimethyl methoxy silane, phenyl dimethoxy silane, phenyl diethoxysilane, phenyl methyldiethoxysilane, phenyl dimethylethoxysilane, benzyl triethoxysilane, benzyl trimethoxysilane, benzyl methyl dimethoxy silane, benzyl dimethyl methoxy silane, benzyl dimethoxy silane, benzyl diethoxysilane, benzyl methyldiethoxysilane, benzyl dimethyl ethoxy silane, benzyl triethoxysilane, dibenzyl dimethoxy silane, dibenzyl diethoxy silane, 3-acetoxymethylpropyl trimethoxy silane, 3-acryloxypropyl trimethoxysilane, allyl trimethoxysilane, allyl triethoxysilane, 4-aminobutyl triethoxysilane, (aminoethyl aminomethyl) phenethyl trimethoxy silane, N-(2-aminoethyl)-3-amino propyl methyl dimethoxy silane, N-(2-aminoethyl)-3-aminopropyltrimethoxysilane, 6-(aminohexyl aminopropyl) trimethoxysilane, p-aminophenyl trimethoxysilane, p-aminophenyl ethoxysilane, m-aminophenyl trimethoxysilane, m-aminophenyl ethoxysilane, 3-aminopropyltrimethoxysilane, 3-aminopropyltriethoxysilane, ω-amino undecyl trimethoxysilane, amyl triethoxysilane, benzoxathiepin dimethyl ester, 5-(bicycloheptenyl) triethoxysilane, bis(2-hydroxyethyl)-3-aminopropyl triethoxysilane, 8-bromo-octyl trimethoxy silane, bromophenyl trimethoxy silane, 3-bromopropyl trimethoxy silane, n-butyl trimethoxysilane, 2-chloromethyl-triethoxysilane, chloromethyl methyl diethoxysilane, chloromethyl methyl diisopropoxy silane, p-(chloromethyl) phenyl trimethoxy silane, chloromethyl triethoxysilane, chlorophenyl triethoxysilane, 3-chloropropyl methyl dimethoxy silane, 3-chloropropyl triethoxysilane, 3-chloropropyl trimethoxysilane, 2-(4-chlorosulfonyl-phenyl) ethyl trimethoxysilane, 2-cyanoethyl triethoxysilane, 2-cyanoethyl trimethoxy silane, cyanomethyl phenethyl triethoxysilane, 3-cyanopropyl triethoxysilane, 2-(3-cyclohexenyl) ethyltrimethoxysilane, 2-(3-cyclohexenyl) ethyltriethoxysilane, 3-cyclohexenyl trichlorosilane, 2-(3-cyclohexenyl) ethyl trichlorosilane, 2-(3-cyclohexenyl) ethyl dimethyl chloro silane, 2-(3-cyclohexenyl) ethyl methyl dichloro silane, cyclohexyl dimethyl chlorosilane, cyclohexylethyldimethoxysilane, cyclohexyl methyl dichlorosilane, cyclohexyl methyl dimethoxy silane, (cyclohexylmethyl) trichlorosilane, cyclohexyl trichlorosilane, cyclohexyl trimethoxysilane, cyclooctyl trichlorosilane, (4-cyclooctenyl) trichlorosilane, cyclopentyl trichlorosilane, cyclopentyl trimethoxysilane, 1,1-diethoxy-1-silacyclopenta-3-ene, 3-(2,4-dinitrophenyl amino) propyl triethoxysilane, (dimethylchlorosilyl) methyl-7,7-dimethyl norpinane, (cyclohexylamino methyl) methyldiethoxysilane, (3-cyclopentadienyl propyl) triethoxysilane, N, N-diethyl-3-aminopropyl) trimethoxysilane, 2-(3,4-epoxycyclohexyl) ethyl trimethoxysilane, 2-(3,4-epoxycyclohexyl) ethyl triethoxysilane, (furfuryl oxymethyl) triethoxysilane, 2-hydroxy-4-(3-ethoxy propoxy) diphenyl ketone, 3-(p-methoxyphenyl) propyl methyl dichlorosilane, 3-(p-methoxyphenyl) propyl trichlorosilane, p-(methylphenethyl) methyl dichlorosilane, p-(methylphenethyl) trichlorosilane, p-(methylphenethyl) dimethyl chlorosilane, 3-morpholino-propyl trimethoxy silane, (3-glycidoxypropyl) methyldiethoxysilane, 3-glycidoxypropyl trimethoxysilane, 1,2,3,4,7,7,-hexachloro-6-methyl diethoxysilyl-2-norbornene, 1,2,3,4,7,7,-hexachloro-6-triethoxysilyl-2- norbornene, 3-iodo-propyl trimethoxysilane, 3-isocyanate propyl triethoxysilane, (mercaptomethyl) methyldiethoxysilane, 3-mercaptopropylmethyl dimethoxysilane, 3-mercaptopropyl silane, 3-mercaptopropyl triethoxysilane, 3-methacryloxypropyl methyl diethoxysilane, 3-methacryloxypropyl trimethoxysilane, methyl {2-(3-trimethoxysilyl propylamino) ethylamino}-3-propionate, 7-octenyl trimethoxysilane, R—N-α-phenethyl-N'-triethoxysilylpropyl urea, S—N-α-phenethyl-N'-triethoxysilylpropyl urea, phenethyltrimethoxysilane, phenethyl methyldimethoxysilane, phenethyl dimethyl methoxysilane, phenethyl dimethoxy silane, phenethyl diethoxymethylsilane, phenethyl methyldiethoxysilane, phenethyl dimethylethoxysilane, phenethyl ethoxy silane, (3-phenylpropyl) dimethyl chlorosilane, (3-phenylpropyl) methyl dichlorosilane, N-phenyl aminopropyltrimethoxysilane, N-(triethoxysilyl propyl) dansylamide, N-(3-triethoxysilyl propyl)-4,5-dihydro-imidazole, 2-(triethoxysilylethyl)-5-(chloro acetoxymethyl) bicycloheptane, (S)-N-triethoxysilylpropyl-O-ment carbamate, 3-(triethoxysilyl propyl)-p-nitrobenzamide, 3-(triethoxysilyl) propyl succinic anhydride, N-[5-(trimethoxysilyl)-2-aza-1-oxo-pentyl]caprolactam, 2-(trimethoxysilylethyl) pyridine, N-(trimethoxysilylethyl) benzyl-N,N,N-trimethyl ammonium chloride, phenyl vinyl diethoxysilane, 3-thiocyanate propyl triethoxysilane, (tridecafluoro-1,1,2,2,-tetrahydrocannabinol octyl) triethoxysilane, N-{3-(triethoxysilyl) propyl}phthalamide acid, (3,3,3-trifluoropropyl) methyl dimethoxy silane, (3,3,3-trifluoropropyl) trimethoxysilane, 1-trimethoxysilyl-2-(chloromethyl) phenyl ethane, 2-(trimethoxysilyl) ethyl phenyl sulfonyl azide, β-trimethoxysilylethyl-2-pyridine, trimethoxysilylpropyl diethylene triamine, N-(3-trimethoxysilylpropyl) pyrrole, N-trimethoxysilylpropyl-N,N,N-tributyl ammonium bromide, N-trimethoxysilylpropyl-N,N,N-tributyl ammonium chloride, N-trimethoxysilylpropyl-N,N,N-trimethylammonium chloride, vinyl methyl diethoxy silane, vinyl triethoxysilane, vinyl trimethoxysilane, vinylmethyldimethoxysilane, vinyl dimethyl silane, vinyl dimethyl silane, vinyl methyl dichlorosilane, vinyl phenyl dichlorosilane, vinyl phenyl diethoxysilane, vinyl phenyl dimethyl silane, vinyl phenyl methyl chloro silane, vinyl triphenoxy silane, vinyl tris-t-butoxysilane, adamantylethyl trichlorosilane, allyl phenyl trichlorosilane, (aminoethyl aminomethyl) phenethyl trimethoxy silane, 3-aminophenoxy-dimethyl vinyl silane, phenyl trichlorosilane, phenyl dimethyl chlorosilane, phenylmethyldichlorosilane, benzyl trichlorosilane, benzyl dimethyl chlorosilane, benzyl methyl dichlorosilane, phenethyl diisopropylchlorosilane, phenethyl trichlorosilane, phenethyl dimethyl chlorosilane, phenethylmethyldichlorosilane, 5-(bicycloheptenyl) trichlorosilane, 5-(bicyclo heptenyl) triethoxysilane, 2-(bicycloheptyl) dimethylchlorosilane, 2-(bicycloheptyl) trichlorosilane, 1,4-bis(trimethoxysilyl ethyl) benzene, bromophenyl trichloro silane, 3-phenoxy propyl dimethyl chlorosilane, 3-phenoxypropyl trichlorosilane, t-butyl phenyl chlorosilane, t-butyl phenyl methoxy silane, t-butyl phenyl dichlorosilane, p-(t-butyl) phenethyl dimethyl chlorosilane, p-(t-butyl) phenethyl trichlorosilane, 1,3 (chlorodimethylsilyl methyl) heptacosane, ((chloromethyl) phenyl ethyl) dimethyl chlorosilane, ((chloromethyl) phenylethyl) methyldichlorosilane, ((chloromethyl) phenylethyl) trichlorosilane, ((chloromethyl) phenylethyl) trimethoxysilane, chlorophenyl trichlorosilane, 2-cyanoethyl trichlorosilane, 2-cyano ethyl methyl dichlorosilane, 3-cyanopropyl methyldiethoxysilane, 3-cyanopropyl methyl dichlorosilane, 3-cyanopropyl methyl dichlorosilane, 3-cyanopropyl dimethylethoxysilane, 3-cyanopropyl methyl dichlorosilane, 3-cyano-propyl trichlorosilane, fluoride alkylsilane, and one kind or a combination of two or more kinds selected from these can be used.

Among these, hexamethyldisilazane is preferably used in the hydrophobic treatment. Accordingly, it is possible to further increase the hydrophobicity of the particles. In addition, it is possible to easily and reliably increase uniformity of the degree of the hydrophobic treatment on each particle and each portion of the particle surface (including surface of the inside of the hole).

In a case of performing the hydrophobic treatment using the silane compound in a liquid phase, the particles to be subjected to the hydrophobic treatment are immersed in liquid containing the silane compound, and accordingly, it is possible to preferably proceed the desired reaction and to form a chemisorbed film of the silane compound.

In a case of performing the hydrophobic treatment using the silane compound in a gaseous phase, the particles to be subjected to the hydrophobic treatment are exposed to vapor of the silane compound, and accordingly, it is possible to preferably proceed the desired reaction and to form a chemisorbed film of the silane compound.

An average particle diameter of the particles configuring the three-dimensional formation powders is not particularly limited, but is preferably from 1 μm to 25 μm and more preferably from 1 μm to 15 μm. Accordingly, it is possible to realize particularly excellent mechanical strength of the three-dimensional structure, to more effectively prevent generation of unexpected irregularities on the three-dimensional structure to be manufactured, and to realize particularly excellent dimensional accuracy of the three-dimensional structure. In addition, it is possible to realize particularly excellent fluidity of the three-dimensional formation powders and fluidity of the three-dimensional formation compositions containing the three-dimensional formation powders and to realize particularly excellent productivity of the three-dimensional structure. In the invention, the average particle diameter means an average particle diameter based on a volume, and this can be acquired, for example, by an average particle diameter of a dispersion obtained by adding a sample to methanol and dispersing the sample with an ultrasonic dispersion device for 3 minutes, in a particle size distribution measuring device (TA-II manufactured by Coulter Electronics, Inc.) using an aperture having a diameter of 50 μm by a coulter counter method.

Dmax of the particles configuring the three-dimensional formation powders is preferably from 3 μm to 40 μm and more preferably from 5 μm to 30 μm. Accordingly, it is possible to realize particularly excellent mechanical strength of the three-dimensional structure, to more effectively prevent generation of unexpected irregularities on the three-dimensional structure to be manufactured, and to realize particularly excellent dimensional accuracy of the three-dimensional structure. In addition, it is possible to realize particularly excellent fluidity of the three-dimensional formation powders and fluidity of the three-dimensional formation compositions containing the three-dimensional formation powders and to realize particularly excellent productivity of the three-dimensional structure. Further, it is possible to more effectively prevent scattering of light due to the particles on the surface of the three-dimensional structure to be manufactured.

When the particles are porous particles, a porosity of the porous particles is preferably equal to or greater than 50% and more preferably from 55% to 90%. Accordingly, a space (hole) for the binding agent to be introduced is sufficiently provided, and it is possible to realize excellent mechanical strength of the porous particles themselves. As a result, it is possible to realize particularly excellent mechanical strength of the three-dimensional structure formed by the binding resin permeating the inside of the hole. In the invention, the porosity of the particles means a ratio (volume ratio) of holes present inside of the particles to apparent volume of the particles, and is a value represented by $\{(\rho_0-\rho)/\rho_0\} \times 100$, when a density of the particles is set as $\rho$ [g/cm$^3$] and a true density of the constituent material of the particles is set as $\rho_0$ [g/cm$^3$].

When the particles are porous particles, an average hole diameter (pore diameter) of the porous particles is preferably equal to or greater than 10 nm and is more preferably from 50 nm to 300 nm. Accordingly, it is possible to realize particularly excellent mechanical strength of the three-dimensional structure to be finally acquired. In addition, in a case of using a colored binding solution containing a pigment in manufacturing the three-dimensional structure, it is possible to preferably hold the pigment in the holes of the porous particles. Therefore, it is possible to prevent unexpected diffusion of the pigment and to more reliably form a high definition image.

The particles configuring the three-dimensional formation powders may have any shapes, but preferably have a spherical shape. Accordingly, it is possible to realize particularly excellent fluidity of the three-dimensional formation powders and fluidity of the three-dimensional formation compositions containing the three-dimensional formation powders, to realize particularly excellent productivity of the three-dimensional structure, to more effectively prevent generation of unexpected irregularities on the three-dimensional structure to be manufactured, and to realize particularly excellent dimensional accuracy of the three-dimensional structure.

The three-dimensional formation powders may contain the plurality types of particles having different conditions described above (for example, types of constituent materials of the particles and the hydrophobic treatment) from each other.

A void ratio of the three-dimensional formation powders is preferably from 70% to 98% and more preferably from 75% to 97.7%. Accordingly, it is possible to realize particularly excellent mechanical strength of the three-dimensional structure. In addition, it is possible to realize particularly excellent fluidity of the three-dimensional formation powders and fluidity of the three-dimensional formation compositions containing the three-dimensional formation powders, to realize particularly excellent productivity of the three-dimensional structure, to more effectively prevent generation of unexpected irregularities on the three-dimensional structure to be manufactured, and to realize particularly excellent dimensional accuracy of the three-dimensional structure. In the invention, the void ratio of the three-dimensional formation powders means a ratio of sum of a volume of voids included in all particles configuring the three-dimensional formation powders and a volume of voids present between the particles, to a capacity of a container, in a case where a container having predetermined capacity (for example, 100 mL) is filled with the three-dimensional formation powders, and is a value represented by $\{(P_0-P)/P_0\} \times 100$, when a bulk density of the three-dimensional formation powders is set as P [g/cm$^3$] and a true density of the constituent material of the three-dimensional formation powders is set as $P_0$ [g/cm$^3$].

A content rate of the three-dimensional formation powders in the three-dimensional formation compositions is preferably from 10% by mass to 90% by mass and more preferably from 15% by mass to 58% by mass. realize sufficiently excellent fluidity of the three-dimensional formation compositions and to realize particularly excellent mechanical strength of the three-dimensional structure to be finally acquired.

Water-Soluble Resin

The three-dimensional formation compositions contain the plurality of particles and the water-soluble resin. By containing the water-soluble resin, it is possible to bind (temporarily fix) the particles to each other and to effectively prevent unexpected scattering of the particles. Therefore, it is possible to ensure the safety of an operator and improve the dimensional accuracy of the three-dimensional structure to be manufactured.

In the specification, an water-soluble resin may be used as long as a part thereof is soluble in water, but solubility with respect to water (mass soluble in 100 g of water) at 25° C. is, for example, preferably equal to or greater than 5 [g/100 g of water] and more preferably equal to or greater than 10 [g/100 g of water].

Examples of the water-soluble resin include a synthetic polymer such as polyvinyl alcohol (PVA), polyvinyl pyrrolidone (PVP), sodium polyacrylate, polyacrylamide, modified polyamide, polyethylene imine, or polyethylene oxide, a natural polymer such as corn starch, mannan, pectin, agar, alginic acid, dextran, glue, or gelatin, and a semisynthetic polymer such as carboxymethyl cellulose, hydroxyethyl cellulose, oxidized starch, or modified starch, and one kind or a combination of two or more kinds selected from these can be used.

Examples of the product of the water-soluble resin include methyl cellulose (product name "METOLOSE SM-15" manufactured by Shin-Etsu Chemical Co., Ltd.), hydroxyethyl cellulose (product name "AL-15" manufactured by FUJI Chemical Inc.), hydroxypropyl cellulose (product name "HPC-M" manufactured by Nippon Soda Co., Ltd.), Carboxymethyl cellulose (product name "CMC-30" manufactured by Nichirin Chemical Industries, Ltd.), sodium starch phosphate (I) (product name "Hoster 5100" manufactured by Matsutani Chemical Industry Co., Ltd.), polyvinylpyrrolidone (product name "PVP K-90" manufactured by Tokyo Chemical Co., LTd.), a methyl vinyl ether/maleic anhydride copolymer (product name "AN-139" manufactured by GAF Gauntlet), polyacrylamide (manufactured by Wako Pure Chemical Industries, Ltd.), modified polyamide (modified nylon) ("AQ nylon" manufactured by Toray Industries, Inc.), polyethylene oxide (product name "PEO-1" manufactured by Seitetsu Kagaku Kogyo K.K.), an ethylene oxide/propylene oxide random copolymer (product name "ALKOX EP" manufactured by Meisei Chemical Works, Ltd.), sodium polyacrylate (manufactured by Wako Pure Chemical Industries, Ltd.), and a carboxyvinyl polymer/crosslinked acrylic water-soluble resin (product name "AQUPEC" manufactured by Sumitomo Seika Chemicals Co., Ltd.)

Among these, when the water-soluble resin is polyvinyl alcohol, it is possible to realize particularly excellent mechanical strength of the three-dimensional structure. In addition, by adjusting a degree of saponification or a degree of polymerization, it is possible to more preferably control characteristics (for example, water solubility or water resistance) of the water-soluble resin or characteristics (for example, viscosity, fixing force of particles, or wettability) of the three-dimensional formation compositions. Therefore, it is possible to more preferably respond the manufacturing of various shapes of the three-dimensional structure. In addition, among the various water-soluble resins, polyvinyl alcohol is provided with a low cost and the supply thereof is stable. Thus, it is possible to perform stable manufacturing of the three-dimensional structure while keeping a production cost low.

When the water-soluble resin contains polyvinyl alcohol, a degree of saponification of the polyvinyl alcohol is preferably from 85 to 90. Accordingly, it is possible to prevent a decrease in solubility of polyvinyl alcohol with respect to water. Therefore, when the three-dimensional formation compositions contain water, it is possible to more effectively prevent a decrease in adhesiveness between the unit layers 2 adjacent to each other.

When the water-soluble resin contains polyvinyl alcohol, a degree of polymerization of the polyvinyl alcohol is preferably from 300 to 1000. Accordingly, when the three-dimensional formation compositions contain water, it is possible to realize particularly excellent mechanical strength of each unit layer 2 and adhesiveness between the unit layers 2 adjacent to each other.

When the water-soluble resin is polyvinyl pyrrolidone (PVP), the following effects are obtained. That is, since polyvinyl pyrrolidone has excellent adhesiveness with respect to various materials such as glass, metal, and plastic, it is possible to realize particularly excellent strength and stability of the shape of the portion of the layer 1 to which the binding solution is not applied, and to realize particularly excellent dimensional accuracy of the three-dimensional structure to be finally acquired. Since polyvinyl pyrrolidone has high solubility with respect to various organic solvents, when the three-dimensional formation compositions contain an organic solvent, it is possible to realize particularly excellent fluidity of the three-dimensional formation compositions, to preferably form the layer 1 in which unexpected unevenness in the thickness is more effectively prevented, and to realize particularly excellent dimensional accuracy of the three-dimensional structure to be finally acquired. Since polyvinyl pyrrolidone has high solubility with respect to water, it is possible to easily and reliably remove the non-bound particles by the binding agent among the particles configuring each layer 1, in the removing step of the non-bound particles (after completing the formation). Since polyvinyl pyrrolidone has appropriate affinity with three-dimensional formation powders, the introduction thereof into the holes as described above does not sufficiently occur, but wettability with respect to the surface of the particle is comparatively high. Accordingly, it is possible to more effectively exhibit a function of temporarily fixing as described above. Since polyvinyl pyrrolidone has excellent affinity with various colorants, it is possible to effectively prevent unexpected diffusion of the colorant, in a case where a binding solution containing a colorant is used in the binding solution application step. Since polyvinyl pyrrolidone has an antistatic function, it is possible to effectively prevent scattering of powders, when using the powders which is not a paste state, as the three-dimensional formation compositions in the layer formation step. In a case of using paste as the three-dimensional formation composition in the layer formation step, when the paste-like three-dimensional formation composition contains polyvinyl pyrrolidone, it is possible to effectively prevent bubbles generating in the three-dimensional formation composition and to more effectively prevent generation of defects due to bubbles in the layer formation step.

When the water-soluble resin contains polyvinyl pyrrolidone, a weight average molecular weight of the polyvinyl pyrrolidone is preferably from 10,000 to 1,700,000 and more preferably from 30,000 to 1,500,000. Accordingly, it is possible to more effectively exhibit the functions described above.

In the three-dimensional formation composition, the water-soluble resin is preferably formed in a liquid state (for example, a dissolved state or a melted state) at least in the layer formation step. Accordingly, it is possible to further increase uniformity in the thickness of the layer 6 formed using the three-dimensional formation composition.

A content rate of the water-soluble resin in the three-dimensional formation composition is preferably equal to or smaller than 15% by volume and more preferably from 2% by volume to 5% by volume, with respect to the true volume of the three-dimensional formation powder. Accordingly, it is possible to sufficiently exhibit the functions of the water-soluble resin described above, to ensure wider spaces for permeation of the binding solution, and to realize particularly excellent mechanical strength of the three-dimensional structure.

Solvent

The three-dimensional formation compositions may contain a solvent in addition to the water-soluble resin described above and the three-dimensional formation powders. Accordingly, it is possible to realize particularly excellent fluidity of the three-dimensional formation compositions and to realize particularly excellent productivity of the three-dimensional structure.

The solvent preferably dissolves the water-soluble resin. Accordingly, it is possible to realize excellent fluidity of the three-dimensional formation compositions and more effectively prevent unexpected unevenness in the thickness of the layer 1 formed using the three-dimensional formation compositions. In addition, when the layer 1 is formed in a state where the solvent is removed, it is possible to adhere the water-soluble resin to the particle with higher uniformity over the entire layer 1 and to more effectively prevent generation of unexpected non-uniformity in the composition. Therefore, it is possible to more effectively prevent unexpected variation in the mechanical strength of each portion of the three-dimensional structure to be finally acquired and to increase reliability of the three-dimensional structure.

Examples of the solvent configuring the three-dimensional formation compositions include water; an alcohol-based solvent such as methanol, ethanol, or isopropanol; a ketone-based solvent such as methylethyl ketone or acetone; a glycol ether-based solvent such as ethylene glycol monoethyl ether or ethylene glycol monobutyl ether; a glycol ether acetate-based solvent such as propylene glycol 1-monomethyl ether 2-acetate or propylene glycol 1-monomethyl ether 2-acetate; polyethylene glycol; and polypropylene glycol, and one kind or a combination of two or more kinds selected from these can be used.

Among these, the three-dimensional formation compositions preferably contain water. Accordingly, it is possible to more reliably dissolve the water-soluble resin and to realize particularly excellent fluidity of the three-dimensional formation compositions and uniformity of the composition of the layer 1 formed using the three-dimensional formation compositions. In addition, the water is easily removed after forming the layer 1, and a negative effect hardly occurs even when water remains in the three-dimensional structure. Further, the water is advantageous in viewpoints of safety for a human body and environmental problems.

When the three-dimensional formation compositions contain the solvent, a content rate of the solvent in the three-dimensional formation compositions is preferably from 5% by mass to 75% by mass and more preferably from 35% by mass to 70% by mass. Accordingly, the effects obtained by containing the solvent as described above are more significantly exhibited and it is possible to easily remove the solvent in the manufacturing process of the three-dimensional structure in a short time, and therefore, it is advantageous in a viewpoint of improvement of the productivity of the three-dimensional structure.

Particularly, when the three-dimensional formation compositions contain water, a content rate of water in the three-dimensional formation compositions is preferably from 20% by mass to 73% by mass and more preferably from 50% by mass to 70% by mass. Accordingly, the effects described above are more significantly exhibited.

Other Components

The three-dimensional formation compositions may further contain components other than the components described above. Examples of such components include a polymerization initiator; a polymerization promoter, a permeation promoter; a wetting agent (moisturizing agent); a fixing agent; an antifungal agent; a preservative; an antioxidant; an ultraviolet absorber; a chelating agent; and a pH adjuster.

4. Binding Solution

Next, the binding solution will be described in detail.

Binding Agent

The binding solution at least contains a binding agent.

The binding agent is a component having a function of binding the particles by curing.

The binding agent is not particularly limited, and a binding agent having hydrophobicity (lipophilicity) is preferably used. Accordingly, when using the binding agent subjected to hydrophobic treatment as the particles, for example, it is possible to further increase affinity between the binding solution and the particles, and it is possible to cause the binding solution to preferably permeate the holes of the particles, by the binding solution applied to the layer 1. As a result, an anchor effect is preferably exhibited by the binding agent, and it is possible to realize excellent mechanical strength of the three-dimensional structure to be finally acquired. In the invention, any hydrophobic curable resins may be used as long as affinity with respect to water is sufficiently low, but solubility with respect to water at 25° C. is preferably equal to or smaller than 1 [g/100 g of water].

Examples of the binding agent include a thermoplastic resin; a thermosetting resin; various photo-curable resins such as a visible light curable resin (photo-curable resin in a narrow sense) which cures by light in a visible light region, an ultraviolet curable resin, and an infrared curable resin; and an X-ray curable resin, and one kind or a combination of two or more kinds selected from these can be used. Among these, the binding agent is preferably the curable resin, in the viewpoints of the mechanical strength of the three-dimensional structure to be acquired or the productivity of the three-dimensional structure. Among various curable resins, the ultraviolet curable resin (polymerizable compound) is particularly preferable in the viewpoints of the mechanical strength of the three-dimensional structure to be obtained or the productivity of the three-dimensional structure and storage stability of the binding solution.

As the ultraviolet curable resin (polymerizable compound), it is preferable to use a resin in which addition polymerization or ring-opening polymerization is started by radical species or cationic species generated from a photoinitiator by ultraviolet ray irradiation and which generates a polymer. Examples of a polymerization method of the addition polymerization include radical, cationic, anionic, metathesis, and coordination polymerizations. In addition, Examples of a polymerization method of the ring-opening polymerization include cationic, anionic, radical, metathesis, and coordination polymerizations.

As an addition polymerizable compound, a compound having at least one ethylenically unsaturated double bond is used, for example. As the addition polymerizable compound, a compound having at least one and preferably two or more ethylenically unsaturated bond at the terminal can be preferably used.

The ethylenically unsaturated polymerizable compound has a chemical form of a monofunctional polymerizable compound and a polyfunctional polymerizable compound or a mixture thereof. Examples of the monofunctional polymerizable compound include unsaturated carboxylic acid (for example, acrylic acid, methacrylic acid, itaconic acid, crotonic acid, isocrotonic acid, and maleic acid) or esters and amides thereof. Examples of the polyfunctional polymerizable compound include ester of unsaturated carboxylic acid and an aliphatic polyalcohol compound and amides of unsaturated carboxylic acid and an aliphatic polyvalent amine compound.

In addition, an addition reactant of unsaturated carboxylic acid ester or amides having a hydroxyl group or a nucleophilic substituent such as an amino group and a mercapto group, and isocyanates and epoxies, and a dehydration condensation reactant with carboxylic acid can also be used. Further, an addition reaction product of unsaturated carboxylic acid ester or amides having an electrophilic substituent such as an isocyanate group or an epoxy group, and alcohols, amines, and thiols, and a substitution reactant of unsaturated carboxylic acid ester or amides having an eliminating substituent such as a halogen group or a tosyloxy group, and alcohols, amines, and thiols can also be used.

As a specific example of a radical polymerizable compound which is ester of unsaturated carboxylic acid and aliphatic polyhydric alcohol, ester (meth)acrylate is representative, for example, and any of monofunctional or polyfunctional compound can be used.

Specific examples of the monofunctional (meth)acrylate include tolyl oxyethyl (meth)acrylate, phenyloxyethyl (meth)acrylate, cyclohexyl (meth)acrylate, ethyl (meth)acrylate, methyl (meth)acrylate, isobornyl (meth)acrylate, and tetrahydrofurfuryl (meth)acrylate.

Specific examples of the bifunctional (meth)acrylate include ethylene glycol di(meth)acrylate, triethylene glycol di(meth)acrylate, 1,3-butanediol di(meth)acrylate, tetramethylene glycol di(meth)acrylate, propylene glycol di(meth)acrylate, neopentyl glycol di(meth)acrylate, hexanediol di(meth)acrylate, 1,4-cyclohexane diol di(meth)acrylate, tetraethylene glycol di(meth)acrylate, pentaerythritol di(meth)acrylate, and dipentaerythritol di(meth)acrylate.

Specific examples of the trifunctional (meth)acrylate include trimethylolpropane tri(meth)acrylate, trimethylolethane tri(meth)acrylate, alkylene oxide-modified tri(meth)acrylate of trimethylolpropane, pentaerythritol tri(meth)acrylate, dipentaerythritol tri(meth)acrylate, trimethylolpropane tri ((meth)acryloyloxypropyl) ether, isocyanuric acid alkylene oxide-modified tri(meth)acrylate, propionic acid dipentaerythritol tri(meth)acrylate, tri((meth)acryloyloxyethyl) isocyanurate, hydroxypivalaldehyde-modified dimethylol propane tri(meth)acrylate, and sorbitol tri(meth)acrylate.

Specific examples of the tetrafunctional (meth)acrylate include pentaerythritol tetra(meth)acrylate, sorbitol tetra(meth)acrylate, ditrimethylolpropane tetra(meth)acrylate, dipentaerythritol propionate tetra(meth)acrylate, and ethoxylated pentaerythritol tetra(meth)acrylate.

Specific examples of the pentafunctional (meth)acrylate include sorbitol penta(meth)acrylate and dipentaerythritol penta(meth)acrylate.

Specific examples of the hexafunctional (meth)acrylate include dipentaerythritol hexa(meth)acrylate, sorbitol hexa(meth)acrylate, alkylene oxide-modified hexa(meth)acrylate of phosphazene, and caprolactone-modified dipentaerythritol hexa(meth)acrylate.

Examples of the polymerizable compound other than (meth)acrylate include itaconic acid esters, crotonic acid esters, isocrotonic acid esters, and maleic acid esters.

Examples of itaconic acid ester include ethylene glycol diitaconate, propylene glycol diitaconate, 1,3-butanediol diitaconate, 1,4-butanediol diitaconate, tetramethylene glycol diitaconate, pentaerythritol diitaconate, abd sorbitol tetraitaconate.

Examples of crotonic acid ester include ethylene glycol dicrotonate, tetramethylene glycol dicrotonate, pentaerythritol dicrotonate, and sorbitol tetra-dicrotonate.

Examples of isocrotonic acid ester include ethylene glycol iso crotonate, pentaerythritol iso crotonate, and sorbitol tetraisocrotonate.

Examples of maleic acid ester include ethylene glycol dimaleate, triethylene glycol dimaleate, pentaerythritol dimaleate, and sorbitol tetra malate.

Examples of other ester include aliphatic alcohol-based esters disclosed in JP-B-46-27926, JP-B-51-47334, and JP-A-57-196231, a compound having an aromatic skeleton disclosed in JP-A-59-5240, JP-A-59-5241, and JP-A-2-226149, and a compound containing an amino group disclosed in JP-A-1-165613.

Specific examples of a monomer of amide of unsaturated carboxylic acid and an aliphatic polyvalent amine compound include methylenebis-acrylamide, methylene bis-methacrylamide, 1,6-hexamethylene-bis-acrylamide, 1,6-hexamethylene-bis-methacrylamide, diethylenetriamine trisacrylamide, xylylene bisacrylamide, and xylylene bismethacrylamide.

Examples of other preferable amide-based monomer include a monomer having a cyclohexylene structure disclosed in JP-B-54-21726.

An urethane-based addition polymerizable compound manufactured using the addition reaction of isocyanate and a hydroxyl group is also preferable, and specific examples thereof include a vinyl urethane compound containing two or more polymerizable vinyl groups in one molecule obtained by adding a vinyl monomer containing a hydroxyl group represented by the following Formula (1) to a polyisocyanate compound including two or more isocyanate groups in one molecule disclosed in JP-B-48-41708.

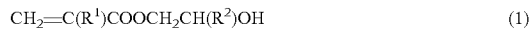

$$CH_2=C(R^1)COOCH_2CH(R^2)OH \qquad (1)$$

(Herein, in Formula (1), $R^1$ and $R^2$ each independently represent H or $CH^3$.)

In the invention, a cationic ring-opening polymerizable compound having one or more cyclic ether groups such as an epoxy group or an oxetane group in a molecule can be preferably used as the ultraviolet curable resin (polymerizable compound).

As the cationic polymerizable compound, for example, a thermosetting compound containing ring-opening polymerizable compounds is used, for example, and among these, a heterocyclic group-containing curable compound is particularly preferable. Examples of such a curable compound include cyclic imino ethers such as an epoxy derivative, an oxetane derivative, a tetrahydrofuran derivative, a cyclic lactone derivative, a cyclic carbonate derivative, or an oxazoline derivative, and vinyl ethers, and among these, an epoxy derivative, an oxetane derivative, and vinyl ethers are preferable.

Preferable examples of an epoxy derivative include monofunctional glycidyl ethers, polyfunctional glycidyl ethers, monofunctional alicyclic epoxides, and polyfunctional alicyclic epoxies.

Specific examples of compounds of glycidyl ethers include diglycidyl ethers (for example, ethylene glycol diglycidyl ether or bisphenol A diglycidyl ether), tri- or higher functional glycidyl ethers (for example, trimethylol ethane triglycidyl ether, trimethylolpropane triglycidyl ether, glycerol triglycidyl ether, or triglycidyl tris-hydroxyethyl isocyanurate), tetra- or higher glycidyl ethers (for example, sorbitol tetraglycidyl ether, pentaerythritol tetraglycidyl ether, polyglycidyl ether of a cresol novolac resin, or polyglycidyl ether of a phenol novolac resin), alicyclic epoxies (for example, CELLOXIDE 2021P, CELLOXIDE 2081, EPOLEAD GT-301, or EPOLEAD GT-401 (all manufactured by Daicel Corporation), EHPE (manufactured by Daicel Corporation), or polycyclohexyl epoxy methyl ethers of a phenol novolac resin), and oxetanes (for example, OX-SQ or PNOX-1009 (all manufactured by Toagosei Company, Limited.)

As the polymerizable compound, an alicyclic epoxy derivative can be preferably used. The "alicyclic epoxy group" is a substructure obtained by epoxidizing a double bond of a cycloalkene ring such as a cyclopentene group or a cyclohexene group by a suitable oxidant such as hydrogen peroxide or peracetic acid.

As the alicyclic epoxy compound, a polyfunctional alicyclic epoxies having two or more cyclohexene oxide groups or cyclopentene oxide groups in one molecule are preferable. Specific examples of the alicyclic epoxy compound include 4-vinyl cyclohexene dioxide, (3,4-epoxy cyclohexyl) methyl-3,4-epoxy cyclohexyl carboxylate, di(3,4-epoxy cyclohexyl) adipate, di(3,4-epoxycyclohexylmethyl) adipate, bis(2,3-epoxy cyclopentyl) ether, di(2,3-epoxy-6-methylcyclohexylmethyl) adipate, and dicyclopentadiene oxide.

A general glycidyl compound having an epoxy group and not having an alicyclic structure in a molecule can be used alone or can be used with the alicyclic epoxy compound described above.

As a general glycidyl compound, a glycidyl ether compound or a glycidyl ester compound can be used, for example, and it is preferable to use with a glycidyl ether compound.

Specific examples of the glycidyl ether compound include an aromatic glycidyl ether compound such as 1,3-bis (2,3-epoxypropyloxy) benzene, a bisphenol A type epoxy resin, a bisphenol F type epoxy resin, a phenol•novolac type epoxy resin, a cresol•novolac type epoxy resin, or trisphenolmethane type epoxy resin, and an aliphatic glycidyl ether compound such as 1,4-butanediol glycidyl ether, glycerol triglycidyl ether, propylene glycol diglycidyl ether, or trimethylolpropane triglycidyl ether. Examples of glycidyl ester include glycidyl ester of a linoleic acid dimer.

As the polymerizable compound, a compound having an oxetanyl group which is a four-membered cyclic ether (hereinafter, also simply referred to as an "oxetane compound") can be used. The oxetanyl-group containing compound is a compound having one or more oxetanyl groups in one molecule.

A content rate of the binding agent in the binding solution is preferably equal to or greater than 80% by mass and more preferably equal to or greater than 85% by mass. Accordingly, it is possible to realize particularly excellent mechanical strength of the three-dimensional structure to be finally acquired.

Other Components

The binding solution may further contain components other than the components described above. Examples of such components include various colorants such as a pigment or dye; a dispersant; a surfactant; a polymerization initiator; a polymerization promoter; a solvent; a permeation promoter; a wetting agent (moisturizing agent); a fixing agent; an antifungal agent; a preservative; an antioxidant; an ultraviolet absorber; a chelating agent; a pH adjuster; a thickener; a filler; an aggregation prevention agent; and an antifoaming agent.

Particularly, when the binding solution contains a colorant, it is possible to obtain the three-dimensional structure colored in a color corresponding to the color of the colorant.

Particularly, by containing a pigment as a colorant, it is possible to realize excellent light resistance of the binding solution and the three-dimensional structure. As a pigment, any one of an inorganic pigment and an organic pigment can be used.

Examples of the inorganic pigment include carbon blacks (C.I. Pigment Black 7) such as furnace black, lamp black, acetylene black, or channel black, iron oxide, and titanium oxide, and one kind or a combination of two or more kinds selected from these can be used.

Among the inorganic pigments, titanium oxide is preferable, in order to realize a preferable white color.

Examples of the organic pigment include an azo pigment such as an insoluble azo pigment, a condensed azo pigment, azo lake, or a chelate azo pigment, a polycyclic pigment such as a phthalocyanine pigment, a perylene and perinone pigment, an anthraquinone pigment, a quinacridone pigment, a dioxane pigment, a thioindigo pigment, an isoindolinone pigment, or a quinophthalone pigment, dye chelates (for example, base dye chelates or acidic dye chelates), dye lake (basic dye lake or acidic dye lake), a nitro pigment, a nitroso pigment, aniline black, and a daylight fluorescent pigment, and one kind or a combination of two or more kinds selected from these can be used.

Specifically, examples of carbon black used as a black pigment include No. 2300, No. 900, MCF88, No. 33, No. 40, No. 45, No. 52, MA7, MA8, MA100, No. 2200B (all manufactured by Mitsubishi Chemical Corporation), Raven 5750, Raven 5250, Raven 5000, Raven 3500, Raven 1255, Raven 700 (all manufactured by Carbon Columbia), Regal 400R, Regal 330R, Regal 660R, Mogul L, Monarch 700, Monarch 800, Monarch 880, Monarch 900, Monarch 1000, Monarch 1100, Monarch 1300, Monarch 1400 (all manufactured by CABOT JAPAN K.K.), Color Black FW1, Color Black FW2, Color Black FW2V, Color Black FW18, Color Black FW200, Color Black 5150, Color Black 5160, Color Black S170, Printex 35, Printex U, Printex V, Printex 140U, Special Black 6, Special Black 5, Special Black 4A, and Special Black 4 (all manufactured by Degussa).

Examples of a white pigment include C.I. Pigment White 6, 18, and 21.

Examples of a yellow pigment include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of a magenta pigment include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245, or C.I. Pigment Violet 19, 23, 32, 33, 36, 38, 43, and 50.

Examples of a cyan pigment include C.I. Pigment Blue 1, 2, 3, 15, 15:1, 15:2, 15:3, 15:34, 15:4, 16, 18, 22, 25, 60, 65, 66, and C.I. Vat Blue 4 and 60.

Examples of other pigments include C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63.

When the binding solution contains the pigments, an average particle diameter of the pigments is preferably equal to or smaller than 300 nm and more preferably from 50 nm to 250 nm. Accordingly, it is possible to realize particularly excellent discharge stability of the binding solution and dispersion stability of the pigments in the binding solution and to form an image having more excellent image quality.

In a case where the binding solution contains a pigment and the particles are porous, when an average hole diameter of the particles is set as d1 [nm] and an average particle diameter of the particles is set as d2 [nm], it is preferable to satisfy a relationship of $d1/d2>1$ and it is more preferable to satisfy a relationship of $1.1 \leq d1/d2 \leq 6$. By satisfying such a relationship, it is possible to preferably hold the pigment in the holes of the porous particles. Therefore, it is possible to prevent unexpected diffusion of the pigment and to more reliably form a high definition image.

Examples of a dye include an acid dyes, a direct dye, a reactive dye, and a basic dye, and one kind or a combination of two or more kinds selected from these can be used.

Specific example of the dye include C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

When the binding solution contains the colorant, a content rate of the colorant in the binding solution is preferably from 1% by mass to 20% by mass. Accordingly, particularly excellent concealing properties and color reproducibility are obtained.

Particularly, when the binding solution contains titanium oxide as the colorant, a content rate of the titanium oxide in the binding solution is preferably from 12% by mass to 18% by mass and more preferably from 14% by mass to 16% by mass. Accordingly, particularly excellent concealing properties are obtained.

When the binding solution contains a pigment and a dispersant, it is possible to realize more excellent dispersibility of the pigment. As a result, it is possible to more effectively prevent a partial decrease in mechanical strength due to deviation of the pigment.

The dispersant is not particularly limited, but a dispersant commonly used for manufacturing a pigment dispersion such as a polymer dispersant is used, for example. Specific examples of the polymer dispersant include materials having one or more kinds of polyoxyalkylene polyalkylene polyamine, vinyl-based polymer and copolymer, acrylic polymer and copolymer, polyester, polyamide, polyimide, polyurethane, an amino-based polymer, a silicon-containing polymer, a sulfur-containing polymer, a fluorine-containing polymer, and an epoxy resin, as a main component. Examples of a commercially available product of the polymer dispersant include AJISPER series manufactured by Ajinomoto Fine-Techno Co., Inc., Solsperse series (Solsperse 36000 or the like) available from Noveon Inc., DISPERBYK series manufactured by BYK Japan K. K., and DISPARLON series manufactured by Kusumoto Chemicals, Ltd.

When the binding solution contains a surfactant, it is possible to realize more excellent abrasion resistance of the three-dimensional structure. The surfactant is not particularly limited, and for example, polyester-modified silicone or ether-modified silicone as a silicone-based surfactant can be used, and among these, polyether-modified polydimethylsiloxane or polyester-modified polydimethylsiloxane is preferably used. Specific examples of the surfactant include BYK-347, BYK-348, BYK-UV3500, 3510, 3530, and 3570 (product names all manufactured by BYK Japan K. K.)

The binding solution may contain a solvent. Accordingly, it is possible to preferably perform adjustment of the viscosity of the binding solution, and even when the binding solution contains a component having high viscosity, it is possible to realize particularly excellent discharge stability of the binding solution by an ink jet method.

Examples of the solvent include (poly)alkylene glycol monoalkyl ethers such as ethylene glycol monomethyl ether, ethylene glycol monoethyl ether, propylene glycol monomethyl ether, and propylene glycol monoethyl ether; acetates such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; and alcohols such as ethanol, propanol, and butanol, and one kind or a combination of two or more kinds selected from these can be used.

A viscosity of the binding solution is preferably from 10 mPa·s to 25 mPa·s and more preferably from 15 mPa·s to 20 mPa·s. Accordingly, it is possible to realize particularly excellent discharge stability of the ink by an ink jet method. In the specification, the viscosity is a value measured at 25° C. using an E-type viscometer (VISCONIC ELD manufactured by TOKYO KEIKI INC.)

In a case of using the plurality of kinds of the binding solutions, at least, it is preferable to use a cyan binding solution, a magenta binding solution, and a yellow binding solution. Accordingly, it is possible to more widen the color reproduction area which can be expressed by combining the binding solutions.

In addition, by using a white binding solution and another colored binding solution together, the following effects are obtained, for example. That is, the three-dimensional structure to be finally acquired can include a first area to which the white binding solution is applied, and an area (second area) which is superposed with the first area and provided on an outer surface side with respect to the first area and to which a colored binding solution, other than white, is applied. Accordingly, the first area to which the white binding solution is applied, can exhibit concealing properties, and it is possible to more increase a chroma of the three-dimensional structure.

In addition, by using the white binding solution and the black binding solution, and the other colored binding solution together, the following effects are obtained, for example. That is, it is possible to reproduce a hue having high brightness and lighter than a hue reproducible with the other colored binding solution by using the white binding solution together, it is possible to reproduce a hue having low brightness and lighter than a hue reproducible with the other colored binding solution by using the black binding solution together, and it is possible to increase a hue of the three-dimensional structure and to widen a range of brightness reproduction.

Hereinabove, the preferred embodiments of the invention have been described, but the invention is not limited thereto.

For example, in the embodiments described above, the configuration of separately providing the collection unit and formation unit has been described, but there is no limitation, and the collection unit and formation unit may be integrally configured. In this case, the layer 1 may be formed by moving the collection unit and formation unit, without moving the squeegee.

In addition, in the manufacturing method of the invention, a pretreatment step, an intermediate treatment step, and a post-treatment step may be performed, if necessary.

As the pretreatment step, a cleaning step of the formation stage is used, for example.

Examples of the post-treatment step include a washing step, a shape adjustment step of performing deburring or the like, a coloring step, a coated layer formation step, and a curable resin curing completion step of performing a light irradiation process or a heating process for reliably curing the uncured curable resin.

In the embodiments described above, the case of performing the discharge step by an ink jet method has been mainly described, but the discharge step may be performed using other methods (for example, other printing methods).

The entire disclosure of Japanese Patent Application No. 2014-052725, filed Mar. 14, 2014 is expressly incorporated by reference herein.

What is claimed is:

1. A three-dimensional structure manufacturing apparatus which manufactures a three-dimensional structure by laminating layers formed using three-dimensional formation compositions containing three-dimensional formation powders, the apparatus comprising:
    a formation unit in which the three-dimensional structure is formed;
    a first supply unit and a second supply unit which supply the three-dimensional formation compositions to the formation unit;
    a first layer formation unit and a second layer formation unit which form the layers configured with the three-dimensional formation compositions on the formation unit; and
    a discharge unit which discharges a binding solution to the layer,
    wherein the discharge unit discharges the binding solution to the layers while relatively moving with respect to the layer, and
    the first supply unit, the first layer formation unit, the discharge unit, the second layer formation unit, and the second supply unit are arranged in an order of the first supply unit, the first layer formation unit, the discharge unit, the second layer formation unit, and the second supply unit, along a movement direction of the discharge unit,
    the first supply unit, the first layer formation unit, the discharge unit, the second layer formation unit, and the second supply unit integrally move in the movement direction respective to the formation unit.

2. The three-dimensional structure manufacturing apparatus according to claim 1, further comprising:

a first ultraviolet ray irradiation unit which emits an ultraviolet ray and is disposed between the second layer formation unit and the discharge unit along the movement direction; and a second ultraviolet ray irradiation unit which emits an ultraviolet ray and is disposed between the first layer formation unit and the discharge unit along the movement direction.

3. The three-dimensional structure manufacturing apparatus according to claim 1, further comprising:

collection units which collect the excess of the three-dimensional formation compositions when forming the layer.

4. The three-dimensional structure manufacturing apparatus according to claim 1, further comprising:

two guide rails which guide the movement of the first layer formation unit and the second layer formation unit, wherein an enclosed space surrounding the discharge unit is formed by the first layer formation unit and the second layer formation unit and the two guide rails.

5. The three-dimensional structure manufacturing apparatus according to claim 1, further comprising:

a vibration unit which applies vibration to the first layer formation unit and the second layer formation unit.

6. The three-dimensional structure manufacturing apparatus according to claim 1, wherein the first supply unit and the first layer formation unit are configured to be integrated, and the second supply unit and the second layer formation unit are configured to be integrated.

7. The three-dimensional structure manufacturing apparatus according to claim 1, wherein the first layer formation unit and the second layer formation unit are one kind selected from a group consisting of squeegees and rollers.

8. A manufacturing method of a three-dimensional structure which manufactures a three-dimensional structure using the three-dimensional structure manufacturing apparatus according to claim 1.

9. A manufacturing method of a three-dimensional structure which manufactures a three-dimensional structure using the three-dimensional structure manufacturing apparatus according to claim 2.

10. A manufacturing method of a three-dimensional structure which manufactures a three-dimensional structure using the three-dimensional structure manufacturing apparatus according to claim 3.

11. A manufacturing method of a three-dimensional structure which manufactures a three-dimensional structure using the three-dimensional structure manufacturing apparatus according to claim 4.

12. A manufacturing method of a three-dimensional structure which manufactures a three-dimensional structure using the three-dimensional structure manufacturing apparatus according to claim 5.

13. A manufacturing method of a three-dimensional structure which manufactures a three-dimensional structure using the three-dimensional structure manufacturing apparatus according to claim 6.

14. A manufacturing method of a three-dimensional structure which manufactures a three-dimensional structure using the three-dimensional structure manufacturing apparatus according to claim 7.

15. A three-dimensional structure which is manufactured by the three-dimensional structure manufacturing apparatus according to claim 1.

16. A three-dimensional structure which is manufactured by the three-dimensional structure manufacturing apparatus according to claim 2.

17. A three-dimensional structure which is manufactured by the three-dimensional structure manufacturing apparatus according to claim 3.

18. A three-dimensional structure which is manufactured by the three-dimensional structure manufacturing apparatus according to claim 4.

19. A three-dimensional structure which is manufactured by the three-dimensional structure manufacturing apparatus according to claim 5.

20. A three-dimensional structure which is manufactured by the manufacturing method of a three-dimensional structure according to claim 8.

* * * * *